United States Patent [19]

Kooker

[11] 4,089,246
[45] May 16, 1978

[54] MUSICAL RHYTHM-TEMPO TUTORING DEVICE

[76] Inventor: Stephen L. Kooker, 3301 Aldwyche Dr., Austin, Tex. 78704

[21] Appl. No.: 712,866

[22] Filed: Aug. 9, 1976

[51] Int. Cl.² .................. G09B 15/04; G04F 5/02
[52] U.S. Cl. .............................. 84/470 R; 84/1.03; 364/900
[58] Field of Search ........ 84/470, 484, 1.03, DIG. 22; 364/900 MS

[56] References Cited

U.S. PATENT DOCUMENTS

| | | | |
|---|---|---|---|
| 3,643,540 | 2/1972 | Rosenstock et al. | 84/484 |
| 3,763,305 | 10/1973 | Nakada et al. | 84/484 X |
| 4,014,167 | 3/1977 | Hasegawa et al. | 84/484 X |

Primary Examiner—Lawrence R. Franklin
Attorney, Agent, or Firm—Richards, Harris & Medlock

[57] ABSTRACT

The specification discloses a musical tutoring device for teaching a wide variety of rhythms and tempos. The device includes a housing. A keyboard is mounted on the housing and includes an array of numerical switches, each corresponding to a different digit and selectively operable to enable the operator to input a musical tempo value, time signature value and a starting location. The keyboard further includes an array of musical note switches, each corresponding to a different musical note value and selectively operable to enable the operator to input a predetermined sequence of musical note values of a musical composition. Storage circuits are provided to store the tempo value, time signature value and musical note values. Circuitry is provided to produce a sequence of tones, the duration and spacing of the individual tones of the sequence corresponding to the stored musical note values. The rhythm and tempo of the composite tone sequence are dependent upon the stored tempo and note values. The device enables the operator to hear and immediately reproduce a sequence of tones representing the input sequence of tempo and note values.

37 Claims, 18 Drawing Figures

FIG. 6

|   | 0  | 1  | 2  | 3  | 4  | 5  | 6  | 7  | 8  | 9  | A  | B  | C  | D  | E  | F  |
|---|----|----|----|----|----|----|----|----|----|----|----|----|----|----|----|----|
| 0 | 00 | 00 | 00 | 00 | 00 | 00 | 00 | 00 | 00 | 00 | A5 | F0 | F0 | 03 | A2 | A9 |
| 1 | 00 | 00 | 00 | 00 | 00 | 00 | 00 | 00 | 00 | 00 | 0D | 21 | 11 | 85 | 06 | 00 |
| 2 | 00 | 00 | 00 | 00 | 00 | 00 | 00 | 00 | 00 | 00 | C9 | A5 | C6 | 08 | A5 | 85 |
| 3 | 00 | 00 | 00 | 00 | 00 | 00 | 00 | 00 | 00 | 00 | 36 | 13 | 3F | 4C | 12 | 05 |
| 4 | 00 | 00 | 00 | 00 | 00 | 00 | 00 | 00 | 00 | 00 | D0 | C9 | CA | 20 | DD | A9 |
| 5 | 00 | 00 | 00 | 00 | 00 | 00 | 00 | 00 | 00 | 00 | 0C | 01 | D0 | F8 | D9 | 4B |
| 6 | 00 | 00 | 00 | 00 | 00 | 00 | 00 | 00 | 00 | 00 | A5 | F0 | F7 | 00 | F4 | 85 |
| 7 | 00 | 00 | 00 | 00 | 00 | 00 | 00 | 00 | 0D | 00 | 0B | 1B | A9 | 00 | F0 | 06 |
| 8 | 00 | 00 | 00 | 00 | 00 | 00 | 00 | 00 | 00 | 00 | 29 | A2 | 01 | 00 | 0F | A9 |
| 9 | 00 | 00 | 00 | 00 | 00 | 00 | 00 | 00 | 00 | 00 | 07 | 1E | 85 | 00 | CA | 01 |
| A | 00 | 00 | 00 | 00 | 00 | 00 | 00 | 00 | 00 | 00 | C9 | 86 | 13 | 01 | D0 | 85 |
| B | 00 | 00 | 00 | 00 | 00 | 00 | 00 | 00 | 00 | 00 | 04 | 3F | A9 | 02 | F8 | 1C |
| C | 00 | 00 | 00 | 00 | 00 | 00 | 00 | 00 | 00 | 00 | F0 | A2 | 00 | 04 | A9 | 4C |
| D | 00 | 00 | 00 | 00 | 00 | 00 | 00 | 00 | 00 | 00 | 25 | 1B | 85 | 08 | 04 | 5D |
| E | 00 | 00 | 00 | 00 | 00 | 00 | 00 | 00 | 00 | 00 | C9 | C5 | 07 | 10 | 85 | FD |
| F | 00 | 00 | 00 | 00 | 00 | 00 | 00 | 00 | 00 | 00 | 05 | 3F | A9 | 20 | 12 | 00 |

FIG. 7

|   | 0  | 1  | 2  | 3  | 4  | 5  | 6  | 7  | 8  | 9  | A  | B  | C  | D  | E  | F  |
|---|----|----|----|----|----|----|----|----|----|----|----|----|----|----|----|----|
| 0 | 00 | A9 | 00 | 4A | 21 | 7F | A5 | A5 | 00 | 40 | 3D | D0 | 29 | 2E | 4C | 4C |
| 1 | 00 | 01 | 38 | AA | A5 | 30 | 2F | 3C | A5 | D0 | 85 | 16 | BF | B0 | E4 | 53 |
| 2 | 00 | 85 | A5 | 4C | 22 | E3 | D0 | E5 | 09 | EE | 3D | C6 | 85 | 08 | FD | F5 |
| 3 | 00 | 1B | 1C | E4 | E9 | A9 | 64 | 21 | 29 | 4C | A5 | 1A | 09 | A5 | D0 | 4C |
| 4 | 00 | 4C | E9 | F5 | 00 | 00 | 38 | A5 | DD | 36 | 1B | A5 | 4C | 09 | A5 | 40 |
| 5 | 00 | D2 | 01 | 00 | 85 | 85 | A5 | 3D | 09 | F5 | F0 | 23 | 36 | 29 | 26 | F7 |
| 6 | 09 | FE | 85 | 4C | 22 | 25 | 2B | E5 | 40 | 18 | 39 | 85 | F5 | DD | 1B | A5 |
| 7 | 08 | E6 | 1C | 5B | A5 | 4C | E5 | 28 | 85 | A5 | 4C | 21 | 00 | 09 | 7D | 1A |
| 8 | 29 | 13 | A5 | F7 | 26 | 00 | 21 | B0 | 09 | 29 | 17 | A5 | 38 | 40 | 0C | D0 |
| 9 | FB | A9 | 1D | 00 | 18 | F7 | A5 | 13 | 4C | 65 | F5 | 24 | A5 | 85 | FB | 02 |
| A | 85 | 00 | E9 | 38 | 7D | 00 | 2C | 4C | 36 | 3C | A5 | 85 | 21 | 09 | 85 | E6 |
| B | 09 | 85 | 00 | A5 | 0C | 00 | E5 | 36 | F5 | 85 | 21 | 22 | E5 | 4C | 26 | 13 |
| C | 4C | 1B | 85 | 21 | FB | 00 | 28 | F5 | A5 | 3C | D0 | A5 | 2D | 36 | C9 | 4C |
| D | 00 | 4C | 1D | E9 | 85 | 00 | 80 | 00 | A5 | A5 | 1A | 09 | A5 | F5 | 7F | 80 |
| E | F7 | 80 | A5 | 01 | 26 | 00 | 12 | 00 | 3B | 2A | A5 | 09 | 22 | 00 | 30 | FC |
| F | 00 | FC | 10 | 85 | C9 | 00 | 38 | 00 | 29 | 65 | 22 | 22 | E5 | 00 | 03 | 00 |

FIG. 8

|   | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | A2 | A9 | 00 | 4B | 4C | A9 | 00 | 00 | 00 | D0 | 3E | 01 | 4C | D0 | 10 | 37 |
| 1 | 7F | 00 | 85 | 85 | 44 | 01 | F0 | 00 | 00 | 31 | 01 | A9 | 00 | 07 | 4C | F0 |
| 2 | 9A | 8D | 07 | 04 | F6 | 85 | 0F | A5 | A5 | A5 | A5 | 20 | F7 | A5 | 48 | CD |
| 3 | A9 | 80 | A9 | 85 | 00 | 0F | EA | 0F | 0F | 1E | 01 | 9D | C9 | 1E | F6 | C9 |
| 4 | FF | 18 | 7D | 06 | A9 | A6 | C8 | C9 | C9 | 85 | 9D | 3F | 04 | 85 | 4C | 36 |
| 5 | 8D | 85 | 85 | A9 | 00 | 34 | 18 | 01 | 0A | 13 | 41 | 01 | D0 | 11 | 56 | F0 |
| 6 | C1 | 0E | 01 | 40 | 85 | A0 | A5 | D0 | D0 | 4C | 01 | E6 | 07 | 4C | F6 | C9 |
| 7 | 19 | 85 | A9 | 85 | 34 | 00 | 0F | 0A | 04 | E9 | A5 | 13 | A5 | 48 | 00 | A5 |
| 8 | 8D | 0D | 77 | 09 | A9 | 85 | 65 | A9 | A9 | F6 | 02 | E6 | 1E | F6 | 00 | 13 |
| 9 | 81 | 85 | 85 | EA | 00 | 00 | 1E | 0A | 64 | A5 | 9D | 13 | 85 | C9 | A5 | C9 |
| A | 18 | 33 | 02 | EA | 85 | D9 | 85 | 85 | 85 | 13 | 40 | E6 | 12 | FF | 33 | 04 |
| B | A9 | 85 | A9 | EA | 1E | 66 | 1E | 0F | 0F | 0A | 01 | 13 | 4C | DD | 10 | F0 |
| C | 1F | 03 | 03 | EA | E6 | FC | 4C | 4C | CA | AA | A5 | A9 | 48 | 07 | D3 | C3 |
| D | 8D | 85 | 85 | EA | 34 | F0 | 58 | 8C | 8A | A5 | 10 | 00 | F6 | A5 | A5 | 4C |
| E | C3 | 05 | 08 | D8 | E6 | 13 | F6 | F6 | C9 | 00 | 9D | 85 | C9 | 1E | 0D | 99 |
| F | 19 | 85 | A9 | 58 | 34 | 85 | 00 | 00 | 06 | 9D | 42 | 33 | 02 | 85 | C9 | F6 |

FIG. 9

|   | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | E6 | A9 | 4C | 19 | C6 | 09 | 3A | 08 | FA | 32 | A9 | F8 | 00 | FF | EA | C0 |
| 1 | 19 | 00 | 13 | 68 | 3A | 09 | A5 | F0 | A5 | 4C | FF | E6 | 00 | C8 | EA | 85 |
| 2 | A9 | 8D | F8 | A8 | A5 | 10 | 3A | 04 | 26 | A0 | 85 | 0C | 00 | C0 | EA | 0B |
| 3 | 09 | C0 | 00 | 68 | 3A | 85 | 29 | C9 | 8D | F7 | 31 | 4C | 8E | 05 | EA | A9 |
| 4 | C5 | 19 | 00 | AA | 29 | 09 | 01 | 40 | CD | 00 | A9 | 00 | C2 | F0 | EA | 01 |
| 5 | 19 | 8A | 48 | 68 | 01 | 4C | F0 | D0 | 19 | 00 | 00 | F8 | 19 | C0 | EA | 85 |
| 6 | 10 | 0A | 8A | 40 | F0 | 00 | 03 | 0F | A9 | 00 | 85 | C9 | AD | D9 | EA | 0C |
| 7 | 06 | 85 | 48 | A5 | 03 | F7 | 4C | A5 | FF | 00 | 0C | 40 | 82 | 08 | 98 | A5 |
| 8 | F0 | 3E | 98 | 0C | 4C | 00 | 3A | 25 | 85 | 00 | A5 | D0 | 18 | FC | 0A | 09 |
| 9 | 04 | A5 | 48 | D0 | 21 | 00 | F5 | 30 | 35 | 00 | 0D | 03 | 49 | D0 | 0A | 29 |
| A | A9 | 09 | A9 | 46 | F5 | 00 | 4C | 06 | A2 | 00 | C9 | 4C | FF | F6 | 0A | DD |
| B | 00 | 4A | 00 | 4C | 4C | A5 | 47 | A5 | FF | 00 | 08 | 38 | 29 | 86 | 05 | 85 |
| C | 85 | 29 | 85 | 6D | 2E | 10 | F5 | 35 | E8 | 00 | D0 | FF | 1F | 0A | 0A | 09 |
| D | 19 | 01 | 35 | F7 | F5 | 4A | A5 | F0 | E0 | 00 | 08 | 4C | F0 | EA | C5 | 4C |
| E | A6 | 05 | AD | 00 | 00 | AA | 0D | 02 | 08 | 00 | 4C | 00 | BD | EA | 0B | A8 |
| F | 19 | 3E | C6 | 00 | A5 | C6 | C9 | D0 | D0 | 00 | 85 | F7 | A0 | EA | F0 | F7 |

FIG. 10

|   | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | A5 | 4C | A5 | 4C | E8 | 85 | A9 | BD | 00 | 21 | 0C | 25 | 00 | 86 | C9 | F7 |
| 1 | 0C | 00 | 09 | 00 | D0 | 18 | F0 | 0C | 00 | C9 | A9 | EA | 00 | 08 | 05 | A5 |
| 2 | C9 | FD | 29 | F7 | F3 | A9 | 85 | FB | 00 | 78 | F0 | EA | 00 | 4C | F0 | 08 |
| 3 | 0F | 8D | E3 | 00 | 68 | 4C | 21 | 85 | 00 | D0 | 85 | EA | 00 | 44 | 03 | 85 |
| 4 | D0 | 80 | 85 | A2 | 68 | 85 | EA | 26 | 00 | 08 | 21 | EA | 00 | F6 | 4C | 07 |
| 5 | F1 | 18 | 09 | 00 | 8A | 16 | EA | A9 | C6 | A5 | A5 | EA | 00 | 00 | 4F | A4 |
| 6 | A5 | 85 | A5 | DD | 0A | 4C | EA | FF | 3A | 09 | 09 | EA | 00 | 00 | F7 | 08 |
| 7 | 31 | 00 | 0B | 76 | AA | 16 | EA | 85 | A5 | 29 | 09 | 4C | 00 | 00 | E8 | B9 |
| 8 | F0 | 8D | 20 | FB | BD | 00 | EA | 25 | 3A | DD | 22 | 00 | A9 | A5 | 8A | 40 |
| 9 | E7 | C0 | 34 | F0 | 86 | 00 | EA | A9 | 29 | 09 | 29 | F7 | 36 | 08 | C9 | FC |
| A | A9 | 19 | F8 | 08 | FB | 00 | EA | 08 | 01 | 40 | BF | 00 | 85 | 29 | 03 | 85 |
| B | 00 | 85 | A5 | E0 | 85 | 00 | EA | 85 | F0 | 85 | 85 | 00 | 0D | 07 | D0 | 08 |
| C | 85 | 32 | 0D | 0B | 17 | 00 | A5 | 0D | 02 | 09 | 09 | 00 | A2 | C9 | 04 | 4C |
| D | 0C | 4C | 20 | D0 | BD | 00 | 10 | 4C | C6 | A5 | A9 | 00 | 00 | 04 | CA | 44 |
| E | 85 | 37 | 34 | 01 | 87 | 00 | 4A | 00 | 21 | 21 | 00 | 00 | 86 | F0 | 4C | F6 |
| F | 31 | F7 | F8 | 60 | FB | 00 | AA | F7 | A5 | D0 | 85 | 00 | 07 | 07 | 4F | 00 |

FIG. 11

|   | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | A9 | 85 | 85 | 0B | 05 | 16 | 03 | 40 | F7 | 33 | 05 | A5 | FF | E8 | 80 | 8D |
| 1 | 38 | 38 | 16 | C9 | F0 | 00 | 4C | FC | 00 | A2 | F0 | 01 | 85 | E0 | 85 | 40 |
| 2 | 85 | 4C | A5 | 06 | 05 | B9 | 52 | 85 | 00 | 00 | 03 | 85 | 33 | 3F | 0D | 01 |
| 3 | 0D | 44 | 37 | D0 | 4C | 40 | F9 | 06 | A9 | 4C | 4C | 00 | 4C | D0 | A5 | A5 |
| 4 | A9 | F6 | C9 | 04 | 4F | FC | A9 | 4C | 37 | 44 | 4F | A5 | 44 | F8 | 13 | 01 |
| 5 | 00 | 00 | 0B | E8 | F7 | 85 | FF | 44 | 85 | F6 | F7 | 02 | F6 | A5 | C9 | 8D |
| 6 | 85 | E6 | 30 | 4C | 00 | 04 | 85 | F6 | 0D | 00 | E8 | 85 | 00 | 09 | 01 | 43 |
| 7 | 03 | 37 | 05 | 48 | 00 | 4C | 38 | A5 | A9 | A5 | 8A | 01 | A5 | 09 | D0 | 01 |
| 8 | 85 | E6 | 4C | F9 | BD | 44 | 4C | 38 | 00 | 0B | C9 | A4 | 13 | 08 | 22 | A5 |
| 9 | 04 | 37 | 4F | 29 | 42 | F6 | 44 | 30 | 85 | 29 | 04 | 0B | 0A | 85 | A9 | 02 |
| A | 85 | A9 | F7 | 07 | FD | 4C | F6 | 03 | 00 | 07 | D0 | B9 | AA | 09 | 20 | 8D |
| B | 05 | F9 | 00 | C9 | 85 | 4F | A5 | 4C | 85 | C9 | 04 | 40 | A9 | A9 | 8D | 42 |
| C | 85 | 85 | 00 | 04 | 17 | F7 | 06 | 44 | 01 | 04 | CA | FC | 00 | 00 | 41 | 01 |
| D | 06 | 18 | A6 | F0 | A4 | A5 | 85 | F6 | 85 | F0 | 4C | 85 | 9D | 85 | 01 | A5 |
| E | 85 | A9 | 37 | 09 | 0B | 04 | 05 | 4C | 02 | 07 | 4F | 02 | 3E | 28 | A5 | 10 |
| F | 37 | 4C | A5 | C9 | 4C | 85 | B9 | 4F | 85 | C9 | F7 | A9 | 01 | A9 | 00 | 8D |

FIG. 12

|   | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | 44 | 00 | A5 | 00 | F0 | C9 | 14 | 18 | E0 | 15 | FA | 41 | 00 | F6 | A5 | A5 |
| 1 | 01 | 00 | 0B | 85 | 36 | FF | 99 | C9 | 9D | 99 | 4C | 01 | 00 | FA | 15 | 13 |
| 2 | A9 | 00 | 29 | 0E | C9 | F0 | 3E | 20 | 3F | 3F | 00 | 99 | 00 | A5 | EA | 69 |
| 3 | 10 | 00 | 07 | 4C | 13 | DB | 01 | F0 | 01 | 01 | FB | 43 | A5 | 14 | 99 | 05 |
| 4 | 8D | 00 | C9 | 00 | F0 | A5 | BD | 14 | E6 | A5 | 00 | 01 | 0B | 99 | 41 | 85 |
| 5 | 45 | 00 | 04 | FB | 32 | 13 | 01 | 4C | 13 | 0B | A5 | 18 | C9 | 40 | 01 | 13 |
| 6 | 01 | 00 | F0 | A5 | C9 | 0A | FF | 8F | 4C | C9 | 14 | A5 | 10 | 01 | 99 | A9 |
| 7 | A9 | 00 | 04 | 0B | 22 | A8 | 85 | FA | F6 | 0A | 99 | 13 | F0 | 99 | 43 | 01 |
| 8 | 4B | 00 | C9 | C9 | F0 | A5 | 15 | 4C | FA | F0 | 40 | 69 | 09 | 42 | 01 | 85 |
| 9 | 85 | 00 | 05 | 0E | 2E | 0B | A5 | AF | A5 | 0B | 01 | 03 | C9 | 01 | 99 | 18 |
| A | 08 | A5 | D0 | F0 | C9 | 0A | 0B | FB | 15 | C9 | 99 | 85 | 11 | 99 | 45 | 4C |
| B | 4C | 09 | 0A | 3F | 23 | AA | 29 | A5 | 09 | 0B | 42 | 13 | F0 | 44 | 01 | 80 |
| C | 44 | 09 | 4C | A5 | F0 | BD | 38 | 13 | 80 | F0 | 01 | 4C | 05 | 01 | 99 | FC |
| D | F6 | 08 | 4F | 0B | 2A | 00 | C9 | 0A | 85 | 07 | A5 | F6 | E6 | 99 | 47 | 00 |
| E | 00 | 85 | F7 | C9 | A5 | FF | 18 | AA | 15 | 4C | 15 | FA | 13 | 46 | 01 | 00 |
| F | 00 | 09 | A9 | 12 | 0E | 85 | F0 | A9 | A5 | C3 | 99 | 00 | 4C | 01 | 18 | 00 |

FIG. 13

|   | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | C6 | 79 | FA | 8B | 60 | 4A | 3C | 32 | 36 | 60 | 00 | 0E | 85 | 3D | 2E | 14 |
| 1 | 13 | 3E | EE | 87 | 5E | 48 | 3B | 32 | 37 | F8 | 00 | C9 | 0E | 01 | 4C | B0 |
| 2 | A5 | 01 | E3 | 84 | 5D | 47 | 3A | 31 | 00 | 00 | 00 | FF | 4C | 09 | 4F | 02 |
| 3 | 13 | 99 | D9 | 80 | 5B | 46 | 39 | 31 | 00 | F9 | 00 | D0 | 00 | 40 | F7 | 85 |
| 4 | 0A | 3E | D0 | 7D | 59 | 45 | 39 | 30 | 00 | 16 | 00 | 03 | F7 | 99 | 00 | 14 |
| 5 | A8 | 01 | C8 | 7A | 58 | 44 | 38 | 00 | 00 | F9 | 00 | 4C | A5 | 3D | 46 | 18 |
| 6 | 18 | BD | C0 | 77 | 56 | 44 | 38 | 27 | 00 | 1A | 79 | 4F | 13 | 01 | 14 | 79 |
| 7 | A5 | 01 | B9 | 74 | 55 | 43 | 37 | 1F | F6 | FA | 3F | F7 | 0A | A5 | 46 | 3C |
| 8 | 0B | FF | B3 | 72 | 53 | 42 | 36 | 17 | C7 | 38 | 01 | A5 | A8 | 0B | 15 | 01 |
| 9 | 0A | 85 | AC | 6F | 52 | 40 | 36 | 0F | F9 | FF | 99 | 0B | A5 | C9 | A5 | 99 |
| A | AA | 15 | A7 | 6D | 51 | 40 | 35 | 07 | 59 | D8 | 3F | C9 | 0B | 22 | 14 | 3C |
| B | BD | 4C | A1 | 6A | 4F | 3F | 35 | 16 | FD | F8 | 01 | 13 | C9 | F0 | 90 | 01 |
| C | 00 | A6 | 9C | 68 | 4E | 3F | 34 | 1E | C8 | 97 | 4C | D0 | 23 | 08 | 06 | A5 |
| D | FF | FB | 98 | 66 | 4D | 3E | 34 | 38 | F8 | F9 | 93 | 07 | D0 | C9 | 09 | 15 |
| E | 85 | 00 | 93 | 64 | 4C | 3D | 33 | 80 | 83 | 00 | FA | A9 | 08 | 12 | 80 | 79 |
| F | 14 | 00 | 8F | 62 | 4B | 3C | 33 | 40 | F9 | 00 | A5 | FF | B9 | F0 | 85 | 3D |

FIG. 14

|   | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | 01 | 3D | B9 | 00 | 00 | 00 | 00 | 00 | A2 | 18 | 88 | F0 | BD | BD | 13 | F8 |
| 1 | 99 | 01 | 3D | 00 | 00 | 00 | 00 | 00 | 00 | 69 | 8A | 03 | 3F | 41 | E6 | BD |
| 2 | 3D | 29 | 01 | 00 | 00 | 00 | 00 | 00 | A0 | 0A | F0 | 4C | 01 | 01 | 13 | 3E |
| 3 | 01 | E0 | 79 | 00 | 00 | 00 | 00 | 00 | 00 | CA | 05 | 00 | C9 | 85 | E6 | 01 |
| 4 | 4C | 85 | 3D | 00 | 77 | 3E | 4B | 00 | E8 | C8 | BD | F7 | E0 | 01 | 13 | D0 |
| 5 | 80 | 39 | 01 | 00 | 5D | 13 | 5B | 00 | A5 | 38 | 66 | 4C | F0 | BD | 4C | F3 |
| 6 | FC | 18 | 05 | 00 | 78 | 3C | 77 | 1E | 13 | E9 | FC | C8 | F3 | 40 | BC | A9 |
| 7 | 00 | B9 | 39 | 00 | 00 | 00 | 03 | 00 | 38 | 01 | 85 | FF | C9 | 01 | FC | 80 |
| 8 | 01 | 3C | 99 | C0 | 00 | 00 | 3E | 00 | E9 | 30 | 07 | 00 | 20 | 85 | 00 | 85 |
| 9 | 02 | 01 | 3D | 03 | 00 | 00 | 1F | 00 | 0A | 06 | B9 | 00 | D0 | 02 | 4C | 0D |
| A | 04 | 79 | 01 | E0 | 00 | 00 | 4B | 00 | 30 | C8 | 66 | E6 | 21 | BD | 10 | A5 |
| B | 08 | 3C | 4C | 01 | 00 | 00 | 5D | 00 | 04 | 4C | FC | 13 | BD | 42 | F5 | 09 |
| C | 10 | 01 | 80 | 00 | 03 | 1F | 7D | 00 | E8 | 95 | 85 | A5 | 3E | 01 | BD | 4C |
| D | 00 | 99 | FC | 00 | 7D | 7F | 13 | 00 | 4C | FC | 08 | 13 | 01 | 85 | 3F | 06 |
| E | 00 | 3C | 00 | F0 | 00 | 00 | 7F | 00 | 87 | 00 | A5 | 0A | 85 | 10 | 01 | F5 |
| F | B9 | 01 | 00 | 00 | 00 | 00 | 5B | 00 | FC | 00 | 1B | AA | 00 | E6 | D0 | 00 |

FIG. 15

|   | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | A5 | F0 | 85 | 10 | 02 | 85 | 00 | CC | B8 | 8D | 0D | 25 | BD | 13 | 1B | 00 |
| 1 | 0D | 18 | 00 | A9 | 4C | 1D | 26 | FF | A9 | C0 | A5 | BD | 42 | 4C | 4C | 00 |
| 2 | C9 | A5 | A9 | D0 | A0 | A9 | A5 | 00 | 00 | 19 | 13 | 3E | 01 | DD | D2 | 00 |
| 3 | 37 | 10 | 4B | 85 | F4 | 01 | 28 | A9 | 18 | A5 | C9 | 01 | 85 | FD | FE | A5 |
| 4 | D0 | 30 | 85 | 10 | 52 | 85 | D0 | 00 | 69 | 09 | 01 | 85 | 10 | 00 | A5 | 11 |
| 5 | 0C | 17 | 01 | A9 | 5A | 1C | 03 | 85 | 01 | 09 | F0 | 00 | 8A | 00 | 13 | 85 |
| 6 | A5 | C9 | A9 | 3E | 5D | 4C | 4C | 28 | EA | 04 | 4C | BD | 4A | CA | 0A | 1A |
| 7 | 0B | 28 | 77 | 85 | 64 | 9B | E6 | 85 | 90 | 85 | EA | 41 | C5 | CA | AA | A9 |
| 8 | 29 | 10 | 85 | 00 | 6B | FE | FF | 1D | FB | 09 | 0A | 01 | 13 | 4C | BD | 01 |
| 9 | 07 | 10 | 02 | A9 | 77 | 4C | C6 | 85 | E8 | A9 | AA | 85 | D0 | AA | 3E | 85 |
| A | C9 | A9 | 4C | 77 | 6B | E0 | 28 | 2F | E0 | 00 | BD | 01 | 12 | FD | 01 | 2F |
| B | 04 | 28 | A0 | 85 | 7E | F4 | A9 | 8D | FF | 85 | 3F | BD | E6 | 00 | 85 | AD |
| C | F0 | 85 | F4 | 01 | 6B | 00 | FF | C0 | D0 | 1A | 01 | 40 | 13 | 00 | 21 | 40 |
| D | 1C | 10 | C9 | A9 | 5A | 4C | 85 | 19 | F3 | A9 | C9 | 01 | E6 | A9 | 4C | 01 |
| E | C9 | A9 | D1 | 7F | A9 | 73 | 21 | A2 | A5 | 40 | 20 | 85 | 13 | 00 | A3 | 85 |
| F | 05 | 00 | 30 | 85 | 00 | FD | 4C | 00 | 32 | 85 | D0 | 02 | E6 | 85 | FE | 00 |

FIG. 16

|   | 0  | 1  | 2  | 3  | 4  | 5  | 6  | 7  | 8  | 9  | A  | B  | C  | D  | E  | F  |
|---|----|----|----|----|----|----|----|----|----|----|----|----|----|----|----|----|
| 0 | AD | 12 | E9 | 00 | 00 | 3F | 1F | E8 | A5 | 00 | 24 | 3F | A9 | F5 | 85 | 46 |
| 1 | 43 | 0A | 10 | 00 | 00 | 01 | C5 | 4C | 20 | E5 | 85 | 01 | 03 | 00 | 2C | FF |
| 2 | 01 | AA | 85 | 00 | 00 | 29 | 1C | 45 | E5 | 1F | 22 | 29 | 85 | A5 | B0 | 00 |
| 3 | 85 | BD | 2D | 00 | 00 | 1F | 30 | FE | 24 | 85 | A5 | 80 | 1B | 13 | 0F | BD |
| 4 | 01 | 36 | A5 | A9 | 00 | 85 | 03 | C6 | 85 | 1C | 09 | F0 | A9 | 0A | EA | 3E |
| 5 | AD | FC | 24 | 00 | 18 | 20 | 4C | 1F | 20 | A9 | 09 | 04 | FF | AA | BD | 01 |
| 6 | 42 | 85 | E9 | 85 | A5 | C5 | 4E | A4 | B0 | 00 | 20 | A5 | 85 | BD | 3E | 85 |
| 7 | 01 | 23 | 00 | 1F | 1F | 1D | FD | 11 | F0 | E5 | 29 | 1A | 25 | 3F | 01 | 27 |
| 8 | 85 | BD | 85 | 85 | 7D | 30 | BD | 88 | EA | 20 | BF | F0 | A9 | 01 | 85 | 4A |
| 9 | 02 | 37 | 2E | 20 | 3E | 0E | 41 | 38 | 98 | 85 | 85 | 06 | A7 | 29 | 27 | 09 |
| A | AD | FC | 4C | 4C | 01 | F0 | 01 | A5 | 65 | 1D | 09 | A5 | 85 | 1F | 4A | 80 |
| B | 44 | 85 | 34 | 75 | 85 | 03 | C9 | 1F | 1A | A5 | A5 | 09 | 26 | 85 | 85 | 85 |
| C | 01 | 24 | FE | FF | 1F | 4C | E0 | E5 | 85 | 23 | 13 | 09 | C6 | 28 | 29 | 29 |
| D | 85 | 38 | 00 | 00 | A5 | 4E | F0 | 23 | 1A | 85 | 0A | 02 | 1C | 4A | 85 | 4C |
| E | 10 | A5 | 00 | 00 | 20 | FD | 05 | 85 | 38 | 21 | AA | 85 | 4C | 85 | 2B | 44 |
| F | A5 | 23 | 00 | 00 | 7D | A5 | E8 | 1F | A9 | A5 | BD | 09 | F6 | 2A | 4C | FF |

FIG. 17

|   | 0  | 1  | 2  | 3  | 4  | 5  | 6  | 7  | 8  | 9  | A  | B  | C  | D  | E  | F  |
|---|----|----|----|----|----|----|----|----|----|----|----|----|----|----|----|----|
| 0 | C0 | 3C | 60 | C0 | 3C | 0A | 85 | 00 | D0 | 1C | 45 | D0 | D0 | 29 | 4C | A5 |
| 1 | 03 | 00 | 00 | 03 | 00 | A5 | 2B | 00 | 04 | 65 | FE | 47 | E0 | BF | 36 | 09 |
| 2 | E0 | 1E | 30 | E0 | 1E | 2B | 88 | 00 | E8 | 23 | 4C | A5 | 4C | 85 | F5 | 29 |
| 3 | 01 | 00 | 00 | 01 | 00 | 85 | D0 | 00 | E8 | 85 | 40 | 22 | 62 | 09 | 4C | FB |
| 4 | F0 | A0 | 00 | F0 | 85 | 3C | E3 | 00 | E6 | 1C | F7 | D0 | FD | A5 | BC | 85 |
| 5 | 00 | 00 | 00 | 00 | 2B | 4A | BD | A2 | 13 | A5 | 4C | 43 | 00 | 3B | FC | 09 |
| 6 | 78 | 50 | 00 | 78 | A0 | 85 | 3F | 08 | A9 | 1D | AA | A9 | 00 | 29 | A5 | 4C |
| 7 | 00 | 00 | E6 | 00 | 02 | 2B | 01 | A9 | 00 | 65 | F5 | 00 | 00 | 80 | 13 | 00 |
| 8 | 00 | 00 | 13 | A9 | A5 | 4C | 85 | 04 | 85 | 24 | A5 | 85 | A5 | D0 | C9 | F7 |
| 9 | 00 | 00 | E6 | 00 | 2C | 60 | 3B | 85 | 1C | 85 | 1A | 2F | 27 | 06 | 1E | 4C |
| A | 00 | 00 | 13 | 85 | 85 | FF | EA | 13 | 85 | 1D | C9 | A5 | 85 | A5 | D0 | 60 |
| B | 00 | 00 | E6 | 26 | 3D | A5 | 4C | BD | 1D | 88 | 02 | 1C | 21 | 09 | F7 | F5 |
| C | 00 | 00 | 13 | 4C | 4A | 2B | 96 | 3F | A4 | D0 | 10 | D0 | A5 | 09 | A9 | 00 |
| D | 00 | 00 | 4C | A8 | 85 | 4A | F5 | 01 | 11 | F1 | F7 | E4 | 09 | 02 | 00 | F6 |
| E | 00 | 00 | 9B | FF | 2C | 09 | 00 | C9 | 18 | 18 | A5 | A5 | 09 | 85 | 85 | 25 |
| F | 00 | 00 | FE | 00 | B0 | 80 | 00 | E0 | A5 | 4C | 21 | 1D | 20 | 09 | 0D | F7 |

MUSICAL RHYTHM-TEMPO TUTORING DEVICE

FIELD OF THE INVENTION

This invention relates to musical tutoring devices, and more particularly to a rhythm-tempo tutoring device.

THE PRIOR ART

Frequently, in a band rehearsal setting or during individual student lessons, a band director or music instructor may wish to demonstrate the rhythm and tempo of a particular sequence of notes of the musical composition being rehearsed. Such a demonstration aids in the ability of the students to play the particular note sequence, because the student has had an auditory impression of what the sequence should sound like. Often the band director will sing the sequence of notes or play the notes on a piano with appropriate musical modifiers to instruct the students. However, this method is time consuming and when hurrying to demonstrate the correct rhythm and tempo, the band director may himself err in repeated presentations.

Another problem frequently encountered in the teaching of music is that a student must spend a considerable time practicing by himself. Often, the student learns errors while practicing which have to be corrected by his instructor at the next lesson. Thus, music students when practicing without the aid of an instructor could substantially benefit from a tutoring device which correctly demonstrates musical note sequences of a composition. However, such a tutoring device must be easy to operate since the beginning student often has little musical ability.

Previously developed musical tutoring devices, such as a metronome, have only permitted an auditory and visual display of the tempo by ticking out a number of beats per minute. Such prior devices have not, however, allowed a student to see and hear the correct tempo of a musical composition, as well as see and hear the rhythm of successive notes, rests and modifiers, such as "dots", "ties" or "slurs", "ritards" and "staccatos".

A need has thus arisen for a rhythm-tempo tutoring device which will enable an instructor to accurately and quickly demonstrate the rhythm and tempo of a sequence of notes of a musical composition to his students. Moreover, a need has arisen for a music tutoring device which can be operated by a beginning music student by merely copying symbols from the lesson being studied for input into the tutoring device. Furthermore, a need has arisen for a visual as well as an audio display of the rhythm and tempo of a sequence of notes.

SUMMARY OF THE INVENTION

In accordance with the present invention, a system and method are presented which enable an accurate visual and auditory reproduction of a wide variety of musical tempos and rhythms. When operated, the present device resembles the sound of a single piano note played by a "perfect" instructor to illustrate to a student the exact rhythm and tempo of the musical composition.

In accordance with the present invention, a rhythm-tempo tutoring device includes a housing. A keyboard is mounted on the housing and includes an array of numerical switches. Each switch corresponds to a different digit and is selectively operable to enable the operator to input a musical tempo value. The keyboard further includes an array of musical note switches. Each note switch corresponds to a different musical note value and is selectively operable to enable the operator to input a predetermined sequence of musical note values of a musical composition. Storage circuits are provided to store the tempo value and the predetermined sequence of musical note values. Circuitry is provided to produce and display a sequence of tones, the duration and spacing of the individual tones of the sequence corresponding to the stored musical note and tempo values. The rhythm and tempo of the tone sequence are dependent upon the stored notes and tempo value to enable the operator to hear and see a sequence of tones representing the input sequence of note values of the musical composition.

DESCRIPTION OF THE DRAWINGS

For a more complete understanding of the present invention and for further objects and advantages thereof, reference is now made to the following detailed description taken in conjunction with the accompanying drawings, in which:

FIGS. 6–17 are tables in hexidecimal notation defining the content of the integrated circuits shown in FIG. 3.

DESCRIPTION OF THE PREFERRED EMBODIMENT

Figure 1:
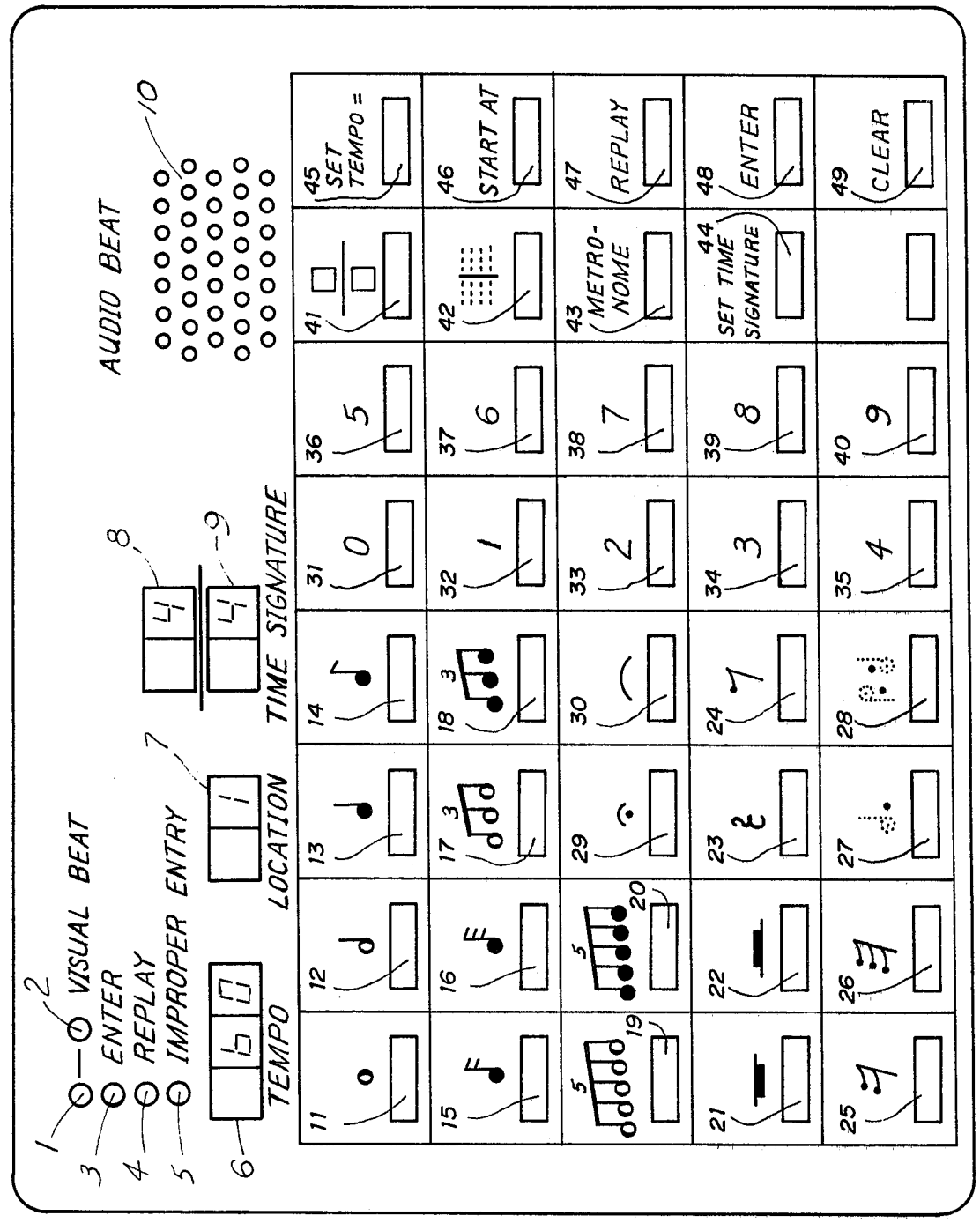
FIG. 1 is an illustration of the front panel of the musical rhythm-tempo tutoring device of the present invention.

Referring to FIG. 1, the front panel of the musical rhythm-tempo tutoring device of the present invention is illustrated. The front panel includes visual displays 1 and 2, which visually display the tempo and rhythm of an input sequence of notes of a musical composition. A visual display 3 is illuminated to indicate to the tutoring device operator that the device is in the proper mode of operation for entering musical symbols. The operation of entering musical symbols will be subsequently described in detail. A visual display 4 is illuminated to indicate that the musical sequence of notes is being replayed, and the visual indicator 5 indicates that the operator has made an improper entry into the device.

The tempo indicator 6 may comprise, for example, three seven-segment alphanumeric light emitting diode arrays and is used to display to the operator the preselected tempo of the musical composition in beats per minute. Visual display 7 represents the number of storage locations which have been filled by the operator after inputting musical symbols into the device. A total of 30 storage locations are available to the operator in the preferred embodiment. Visual displays 8 and 9 represent the selected time signature of the musical composition, wherein the number displayed in display 8 represents the number of beats per measure of the composition and the number displayed in display 9 represents the note type which receives one beat. Displays 7, 8 and 9 may comprise, for example, seven-segment alphanumeric light emitting diode arrays.

A speaker 10 is included in the front panel of the tutoring device to produce a sequence of tones representative of the tempo and rhythm of the keyboard inputted note sequence of the musical composition. In the preferred embodiment, for simplicity of construction, only tones of approximately 1000 Hz are used in the sequence of tones. However, since the generated tone sequence has the tempo and rhythm of the composition, the student will be able to perceive the desired temporal characteristics of the particular musical composition.

The front panel of the rhythm-tempo tutoring device further includes a keyboard array to enable the operator to input preselected tempo, time signature, starting location and musical note values into the device. Push-button switches 11–20 correspond to musical note values. Specifically, push-button switch 11 represents a whole-note, push-button switch 12 represents a half-note, push-button switch 13 represents a quarter-note, push-button switch 14 represents an eighth-note and push-button switch 15 represents a sixteenth-note. Further, push-button switch 16 represents a thirty-second-note, push-button switch 17 represents a half-note-triplet, push-button switch 18 represents a quarter-note-triplet, push-button switch 19 represents a half-note-quintuplet and push-button switch 20 represents a quarter-note quintuplet.

The keyboard further comprises six push-button switches 21–26, which correspond to musical rests. In particular, push-button switch 21 represents a whole-note rest, push-button 22 represents a half-note rest, push-button 23 represents a quarter-note rest, push-button 24 represents an eighth-note rest, push-button switch 25 represents a sixteenth-note rest and push-button 26 represents a thirty-second note rest.

Four musical modifier push-button switches are also provided on the keyboard. Push-button switch 27 represents a dotted note value, push-button switch 28 represents that the preceding input note is to be played staccato, push-button switch 29 represents a ritard and push-button 30 represents that the next note is tied to the preceding note, or slurred.

Push-button switches 31–40 represent the digits 0–9 respectively. Push-button switches 31–40 are utilized to input through the device the tempo, time signature and starting location values.

Push-button switches 41–49 are functional switches utilized to initiate the device to receive the tempo, time signature, starting location and note values and to operate and replay the inputted musical note values. The operation of the switches 41–49 will be described in detail subsequently, but in general, push-button 41 is utilized to input the time signature information and push-button switch 42 is utilized to increase the number of warm-up notes. Push-button switch 43 is utilized to initiate the metronome portion of the rhythm-tempo tutoring device, while push-button switch 44 is utilized in connection with push-button switch 41 to initialize the time signature. Push-button switch 45 is utilized to initialize the tempo. Push-button switches 46 and 47 are utilized to operate the device once all initial inputting has been accomplished. Push-button switch 48 is utilized in connection with inputting the individual note values and push-button switch 49 is used to clear an incorrect entry or clear all storage locations for a new input sequence.

Figure 2A:
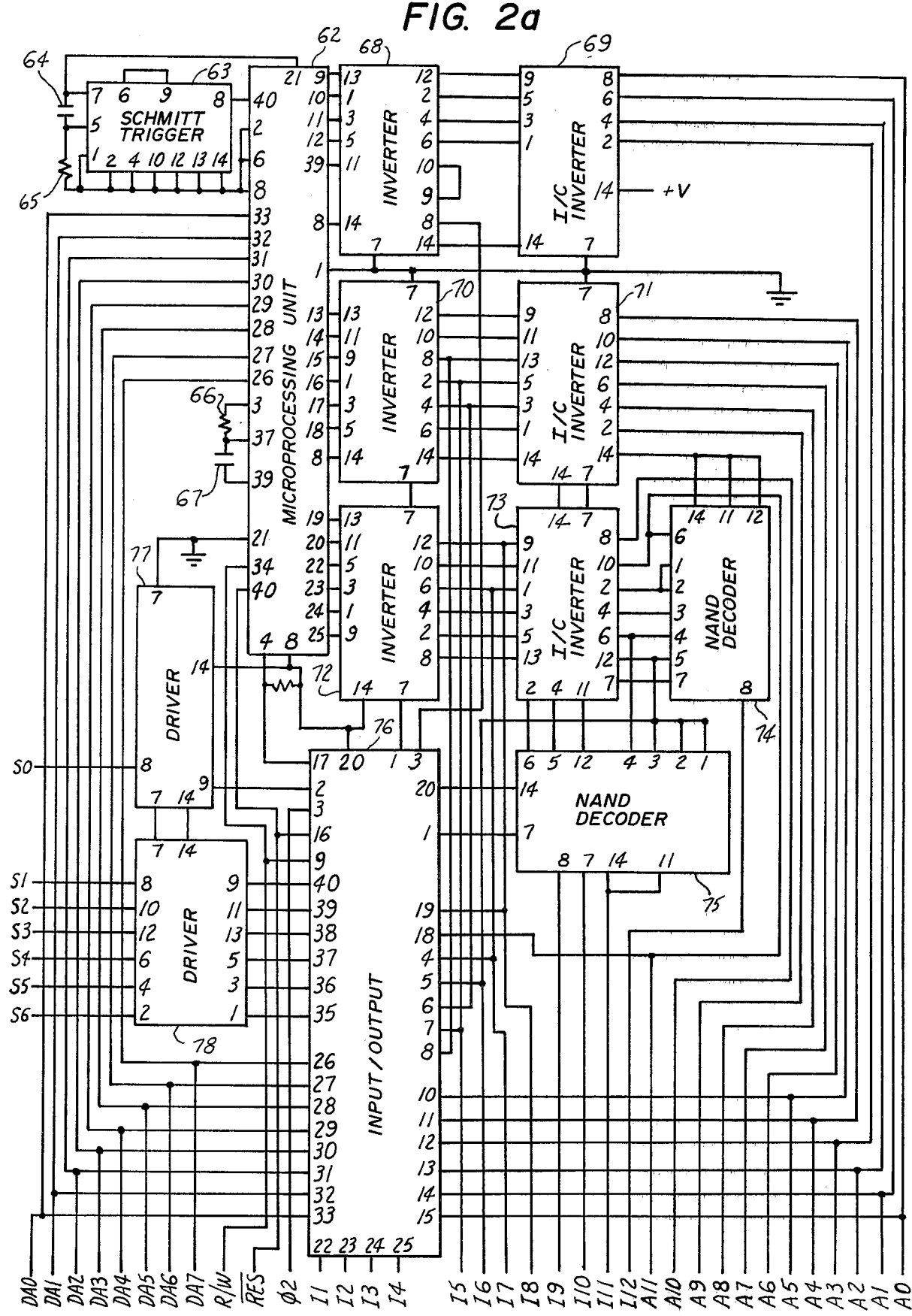
FIGS. 2a–2b are detailed schematic drawings of the logic circuitry of the device.
Figure 2B:
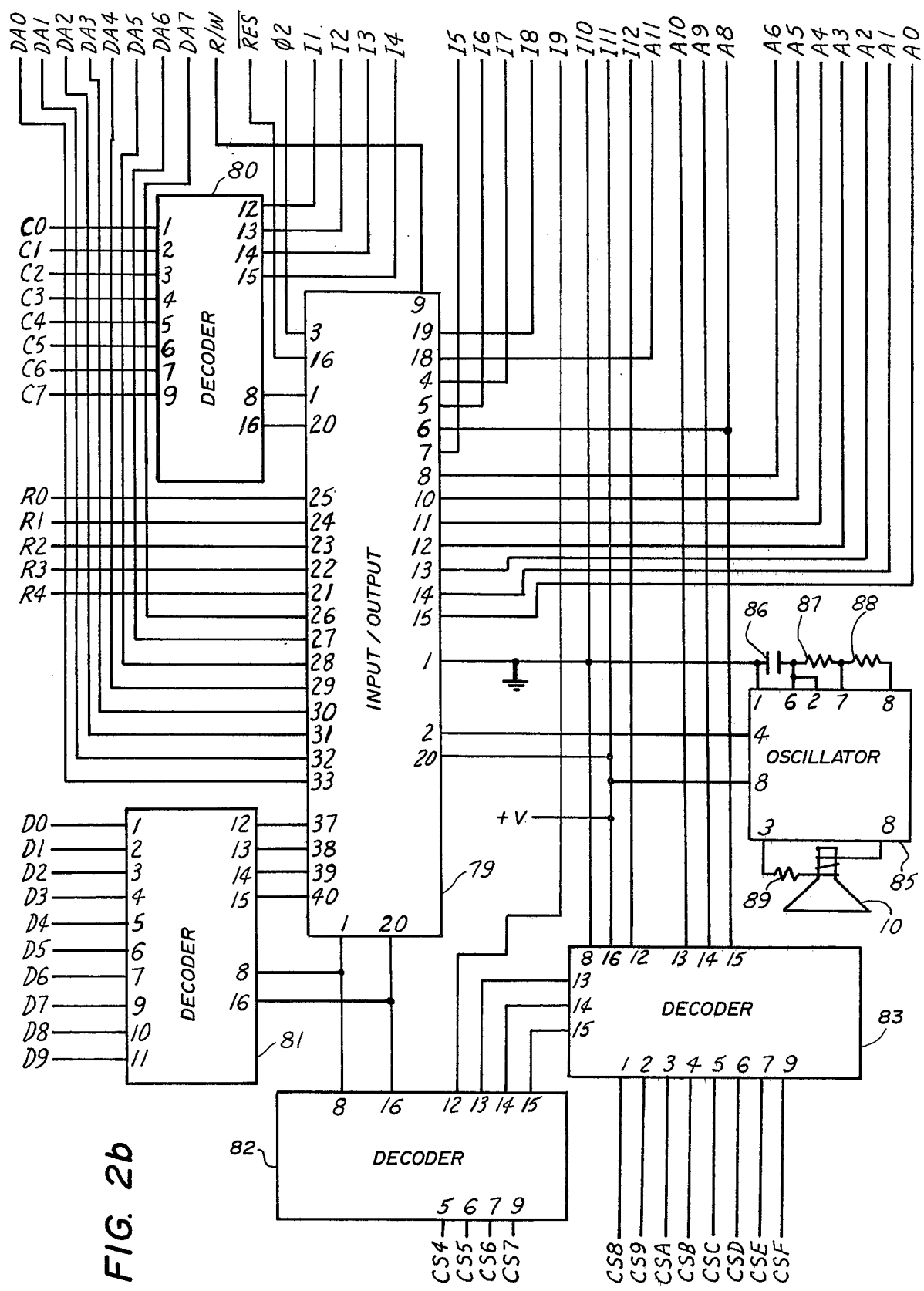

Referring to FIGS. 2a and 2b, the schematic circuitry for the rhythm-tempo tutoring device is illustrated. FIGS. 2a and 2b are drawn to be matched in a side-by-side relationship to illustrate the electrical schematic. Referring specifically to FIG. 2a, a microprocessing unit 62 comprises a general purpose standard integrated circuit, such as a MCS6502 I/C. Microprocessing unit 62 is interconnected to integrated circuit 63, which comprises standard Dual 4-input NAND Schmidt Trigger unit. Schmidt Trigger 63 operates together with capacitor 64 and resistor 65 to provide an initializing pulse to the microprocessing unit 62 when power has been applied to the tutoring device. A resistor 66 and capacitor 67 are interconnected to the microprocessing unit 62 to complete the internal clock oscillator of the microprocessing unit 62.

Integrated circuits 68–73 are interconnected to one another and to the microprocessing unit 62 and may comprise, for example, SN7404N inverters. Integrated circuits 68–73 are standard hex inverter units, which function to provide buffering and inversion for the address lines of the microprocessing unit 62. Interconnected to the inverter 73 are integrated circuits 74 and 75, which may comprise, for example, SN7430N units. Integrated circuits 74 and 75 are standard 8-input NAND units, which provide partial decoding of the address lines of the microprocessing unit 62.

Figure 5:
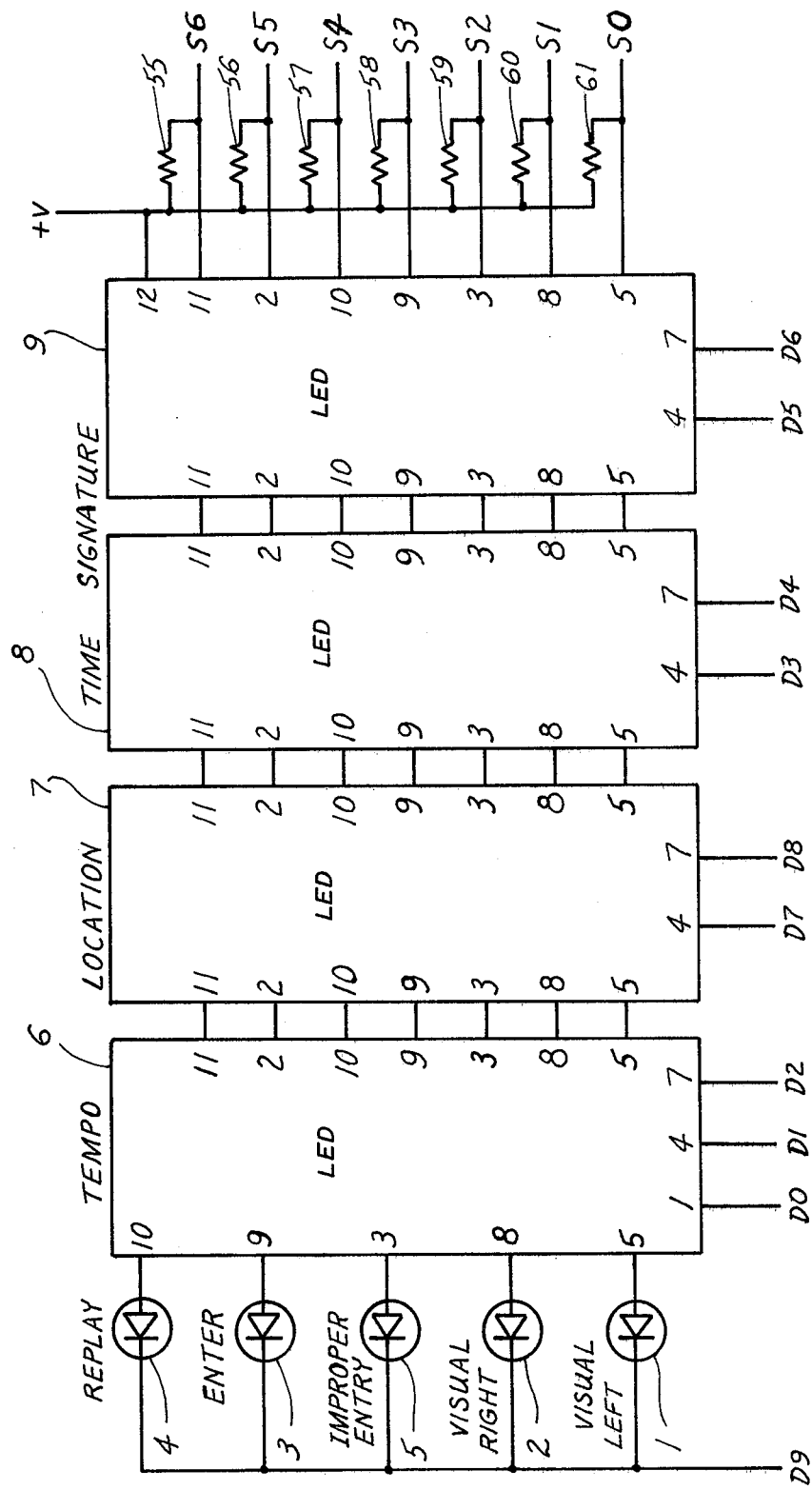
FIG. 5 is a schematic diagram of the visual displays of the device.

Interconnected to inverters 68–73 and microprocessing unit 62 is integrated circuit 76, which may comprise a MCS6530 I/C. Integrated circuit 76 provides input-/output, timing, and informational storage used in conjunction with the microprocessing unit 62. Integrated circuits 76 and 79 (FIG. 2b) each include a 64 byte random access memory. These random access memories provide storage capability for thirty words including time signature, tempo, note value and computation variable information. The number of storage locations filled is displayed in the display 7 as previously described. Integrated circuit 76 is interconnected to integrated circuits 77 and 78, which are standard hex open-collector drivers which provide sufficient current drive for signal points S0–S6 to operate the light emitting diodes of the visual displays (FIG. 5).

Figure 4:
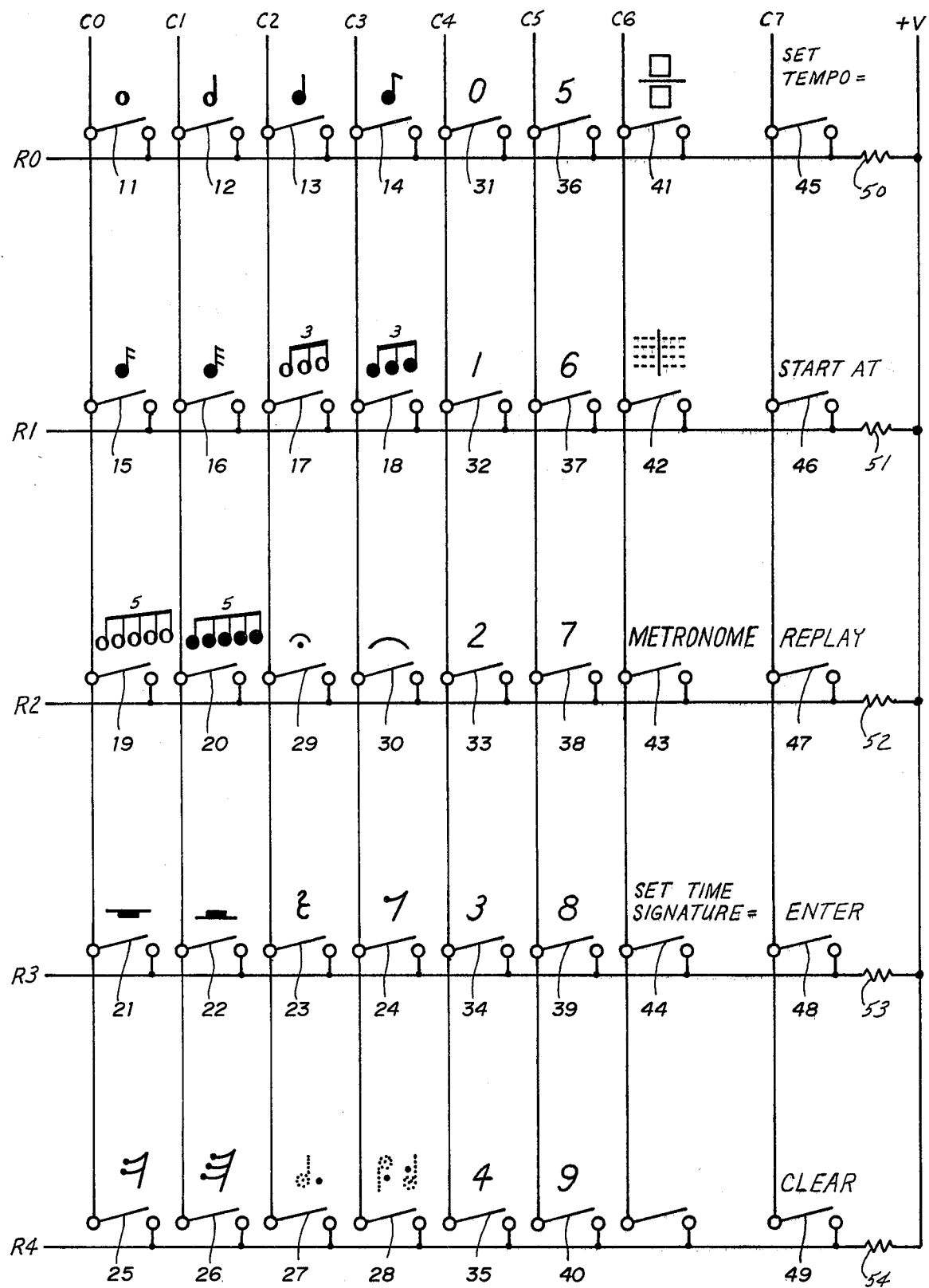
FIG. 4 is a schematic diagram of the keyboard switching matrix.

Referring now to FIG. 2b, integrated circuit 76 is interconnected via signal leads A0–A5 and I5–I8 to integrated circuit 79, which may comprise a MCS6530 I/C. Integrated circuit 79 provides general input/output and informational storage in conjunction with the operation of the microprocessing unit 62 (FIG. 2a). Interconnected to integrated circuit 79 are decoders 80 and 81. Integrated circuit 80 is a standard open-collector binary-to-decimal decoder unit, such as a SN74145N, which generates the sequentially occurring pulse signals that are applied to signal points C0–C7 of the matrix keyboard (FIG. 4). Integrated circuit 81 is also a standard open-collector binary-to-decimal decoder unit, which provides sequentially occurring pulse signals to the signal points D0–D9 required for the operation of the visual displays (FIG. 5).

Integrated circuit 74 (FIG. 2a) is interconnected to an integrated circuit 83. Integrated circuit 75 (FIG. 2a) is interconnected to an integrated circuit 82. Integrated circuits 82 and 83 are standard binary-to-decimal decoders, such as SN7442N I/Cs. which provide partial decoding of the addressing generated by the microprocessing unit 62 (FIG. 2a). Integrated circuit 79 is also interconnected to integrated circuit 85, which comprises a SE555 circuit. Integrated circuit 85 together with capacitor 86 and resistors 87 and 88 comprise an audible tone oscillator, which is controlled by the logic state at pin 4 of oscillator 85. Oscillator 85 drives the speaker 10 which has its current regulated by resistor 89. In the preferred embodiment, oscillator 85 drives speaker 10 to generate 1000 Hz tones.

Figure 3:
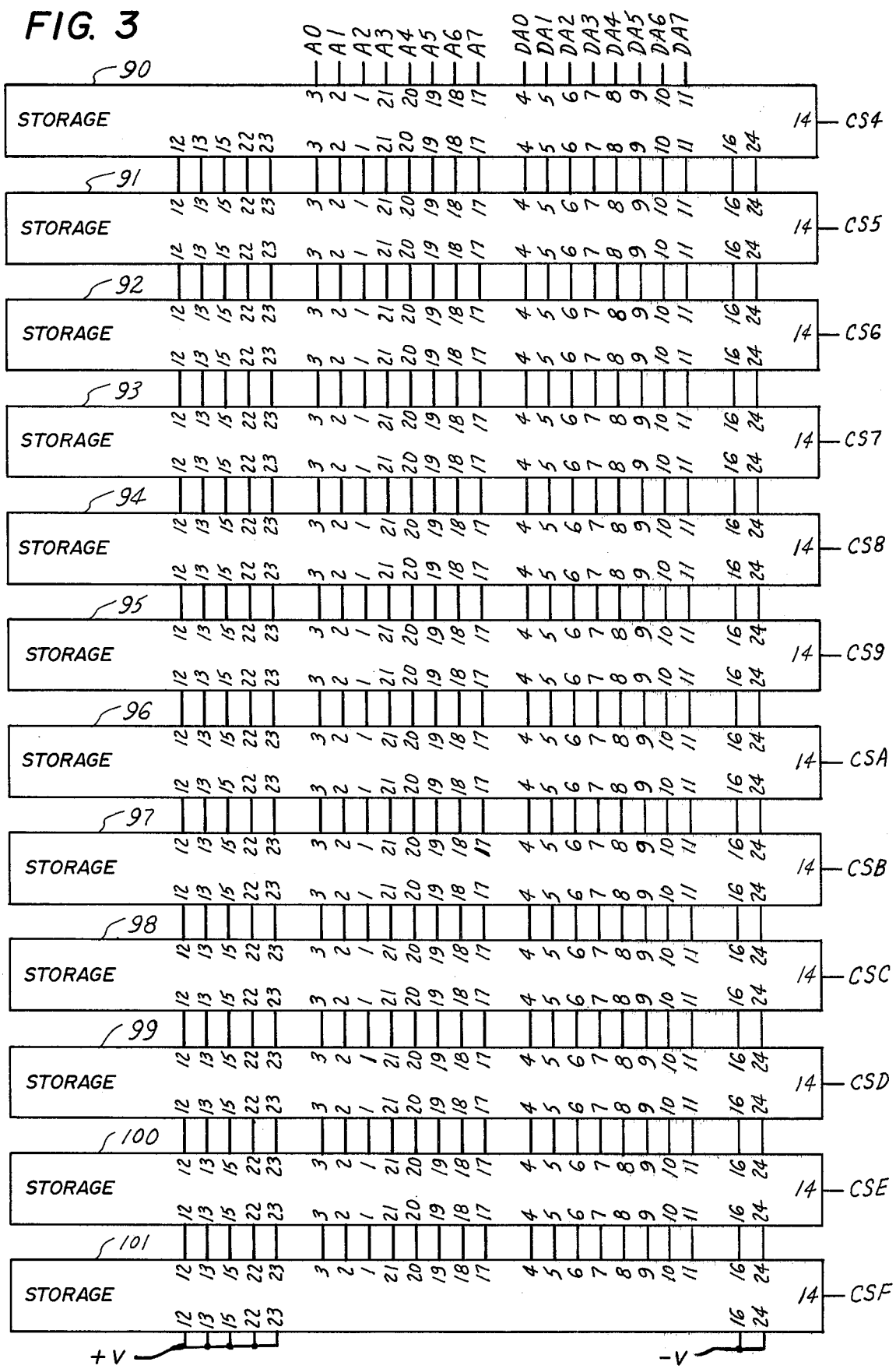
FIG. 3 is a detailed schematic drawing of the integrated circuit informational storage units of the device.

Referring to FIG. 3, integrated circuits 90-101 are illustrated. Integrated circuits 90-93 are interconnected to integrated circuit 82 (FIG. 2b) and integrated circuits 94-101 are interconnected to integrated circuit 83 (FIG. 2b). Integrated circuits 90-101 are standard 2048-bit informational-storage units, such as 1702A circuits, which store information required by the microprocessing unit 62 (FIG. 2a). Signals A0-A7 convey address bits from integrated circuits 69 and 71. Signals DA0-DA7 convey data bits to the microprocessing unit 62. The input signals CS4-CSF occur so that only one of integrated circuits 90-101 is operable at any given time.

Referring now to FIGS. 6-17, the logic tables for integrated circuits 90-101, respectively, are illustrated. The logic information in the tables is recorded in the hexidecimal number system. Referring to FIG. 6, the alphanumerics O-F progress horizontally across the top of FIG. 6 and are each the most significant digit of the two digit hexidecimal address, which is used to identify a particular 8-bit cell within the 2048 bits inside each storage unit. The alphanumerics O-F which progress vertically from top to bottom along the leftmost edge of FIG. 6 represent the least significant digit of the 2-digit hexidecimal address. Each of the 256 2-digit hexidecimal numbers appearing in FIG. 6 detail the bit pattern of a particular 8-bit cell of the integrated circuit. For example, cell A0 contains the data A5. Correspondingly, FIGS. 7-17 represent the bit patterns for integrated circuits 91-101 respectively. The data represented in FIGS. 6-17 may be accessed for use by the microprocessor circuitry of the invention in a manner to be subsequently described.

Referring to FIG. 4, the schematic circuitry representing the keyboard push-button switches 11-49 of FIG. 1 is shown. The push-button switches 11-49 are interconnected in a matrix having one set of signal points C0-C7 and a second set of signal points R0-R4. In operation, the signal points C0-C7 normally remain in a logic "1" state and are periodically caused to change to a logic "0" state through the operation of the microprocessing unit 62 (FIG. 2a). The microprocessing unit 62 generates a plurality of sequentially occurring pulse signals, which occur at a high rate, such that only one of the signal points C0-C7 is at a logic "0" state at any given time while the other signal points remain at logic "1".

Within the time period required to generate the sequentially occurring pulse signals, at points C0-C7, the microprocessing unit 62 examines the signal points R0-R4. If no push-button switch has been depressed, signal points R0-R4 remain at a logic "1" state, since no appreciable current flows to the microprocessing unit 62 and none flows through the push-button switches 11-49. Therefore, no voltage drop occurs across any of the resistors 50-54 (FIG. 4). However, when a push-button switch 11-49 is closed, sufficient current is drawn through one of the resistors 50-54. This current causes a voltage drop across an associated resistor which causes one of the signal points R0-R4 to change to a logic "0" state. The microprocessing unit 62 may then readily detect which push-button switch has been depressed by combining the information as to which of the signals C0-C7 is holding at a logic "0" state, simultaneously with the information from signal points R0-R4.

Referring to FIG. 5, the schematic circuitry representing the visual displays of the rhythm-tempo tutoring device is shown. Visual displays 1-5 are light emitting diodes and displays 6-9 are seven-segment multidigit light emitting diode (LED) arrays, such as 276-055 LDS arrays sold by Radio Shack. In operation of the displays 1-9, the signal points D0-D9 normally remain in the logic "1" state and are periodically caused to change to a logic "0" state through the operation of the microprocessing unit 62 (FIG. 2a). The microprocessing unit 62 generates a plurality of sequentially occurring pulse signals, which occur at a high rate such that only one of the signal points D0-D9 is at a logic "0" state at any given time, while the other signal points remain at logic "1".

Within the time period required to generate the sequentially occurring pulse signals at points D0-D9, the microprocessing unit 62 generates sequentially occurring pulse signals which are applied to signal points S0-S6. Microprocessing unit 62 causes each of the signal points S0-S6 to be either a logic "0" or a logic "1". In the logic "1" state a particular light emitting diode connected with its anode at one of the signal points S0-S6 and its cathode at one of the signal points D0-D9 will be illuminated.

OPERATION OF THE RHYTHM-TEMPO TUTORING DEVICE

The general operation of the rhythm-tempo tutoring device of the present invention will now be discussed and in particular with reference to the following five specific examples. Upon the initial application of power to the device, visual display 1 will be "on" and visual displays 2-5 will be "off". The number "60" will be displayed in display 6, display 7 will display the number "1", display 8 will display the number "4" and the display 9 will display the number "4". This initial state of the device displayed in FIG. 1 will indiciate to the operator that: (1) no musical upbeat is occurring, (2) the device is not in the proper state for entering musical symbols, (3) the device is not in the proper state for replaying musical note durations and spacings previously calculated and stored and (4) the most recent user-entered data was not an obvious error. Display 6 will indicate the initial musical tempo of 60 beats per minute and displays 8 and 9 will indicate a time signature of "4/4". This time signature will be utilized by the microprocessing unit 62 to calculate the number of warm-up notes. The display 7 will show "1" to indicate that the first of 30 possible storage locations is next to be filled. In this initial state, no audible sound is produced by the speaker 10.

In a typical situation, the user may desire to enter a sequence of musical note values of a musical composition written to be played at a tempo from "60" beats per minute. For example, if music written having a tempo of "100" beats per minute is to be inputted into the device, the user first depresses the SET TEMPO switch 45, then in succession depresses switches 32, 31 and 31. Following this operation, display 6 will read "100", indicating that a musical tempo of "100" beats per minute will henceforth be used by the microprocessing unit 62 in any calculations.

If music written with a time signature of "¾" is to be entered, the user first depresses the SET TIME SIGNATURE key 44, then depresses in succession the "3"

switch 34, the "□/□" switch 41, and the "4" switch 35. Following this switch operation, displays 8 and 9 will read "¾", indicating a musical time signature of "¾" will henceforth be used by the microprocessing unit 62 in calculating the number of warm-up notes.

Once the user is satisfied that the TEMPO display 6 and the time signature displays 8 and 9 are correct, he depresses the ENTER switch 48. Two changes then occur. First, the ENTER display 3 changes from "off" to "on", confirming that the device is in the proper state for inputting musical symbols. Second, the LOCATION display 7 changes from "1" to "4", indicating that the first three of 30 available storage locations have been used to store information about the tempo shown on the TEMPO display 6, and that further entries will be stored beginning in the fourth of the thirty available storage locations.

In operation of the rhythm-tempo tutoring device, tempo, time signature and musical note value information input through the keyboard switch array is stored in input/output integrated circuit 79. Display information is stored in input/output integrated circuit 76. The microprocessor 62 utilizes this stored information to calculate the duration of the note values associated with the input musical symbols according to the program and note value tables stored in the storage units 90–101. Input/output integrated circuit 79 is addressed to call from memory the stored input note sequence.

Following the operation of the ENTER switch 48, the user may then enter musical symbols in the order of their occurrence in the musical composition by depressing note switches 11–20, rest switches 21–26, modifier switches 27–30 and the bar switch 42. In the following examples, "spacing" of two notes is defined as the elapsed time between the onset of the first note and the onset of the second note. "Duration" is defined as the fraction of time occupied by the tone and is equal to ⅞ of the note's spacing. As will be apparent from the following examples, the spacing is determined by the selected tempo value. Intervals of time discussed below should be understood to be only approximate values.

EXAMPLE 1

Example 1 illustrates the use of the rhythm-tempo tutoring device to replay the following sequence of musical notes:

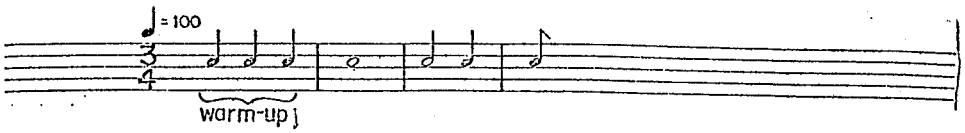

The user may begin by depressing the whole-note switch 11, the half-note switch 12, the quarter-note switch 13, and the eight-note switch 14 as the first four notes to be input from the musical composition. As the whole-note switch 11 is depressed, the LOCATION display 7 changes from "4" to "5", confirming that the microprocessing unit 62 has stored the result of a calculation to the whole-note in the fourth of 30 available storage locations. As the half-note switch 12 is depressed, the LOCATION display 7 changes from "5" to "6", confirming that the microprocessing unit 62 has stored the result of a calculation corresponding to the half-note in the fifth of 30 available storage locations. Similarly, as the quarter-note switch 13 is depressed, the LOCATION display 7 changes from "6" to "7", and as the eighth-note switch 14 is pressed, the LOCATION display 7 changes from "7" to "8", confirming that the microprocessing unit 62 has stored the result of a calculation corresponding to the eighth-note in the seventh available location.

If these first four notes of the musical composition represent the rhythmic sequence of interest, the user may hear and see the exact rhythm and tempo of the four notes by first depressing the START AT switch 46, switch 32, and then the REPLAY switch 47. A time delay of approximately ½-second occurs immediately following the operation of the REPLAY switch 47. During this delay all visual displays 1 through 9 are turned "off" and no audible sound is heard from the speaker 10. Following the delay, three "warm-up" notes are heard from the speaker 10 and displayed by the VISUAL BEAT indicators 1 and 2. The warm-up notes are spaced in time one-hundredth of a minute apart, this being determined by the tempo of 100 beats per minute. The number of warm-up notes, three, is a reflection of the time signature of "¾". The duration of the warm-up notes is less than one-third of their spacing. An audible tone of approximately 1000 Hz is heard from the speaker during the presence of each warm-up note.

Following the third of the warm-up notes and spaced from its beginning by 1/100-minute, another audible and visual note of 1000 Hz is transmitted from speaker 10 and displayed by indicators 1 and 2. This note corresponds to the first note value stored by the microprocessing unit 62. The whole-note's audible and visual duration is ⅞ of its spacing from the first following note, and has a spacing of 4/100-minute, which is determined by the 100 beat per minute tempo. The note's duration is therefore, (⅞) (4/100) = 7/200-minute. The next note corresponds to the half-note which was stored by the microprocessing unit 62 when the switch 12 was depressed. The half-note's audible and visual duration is ⅞ of its spacing from the second following note, and has a spacing of 2/100-minute. The next note also is 1000 Hz and corresponds to the quarter-note and has an audible and visual duration of ⅞ of its spacing from the eighth note, and has a spacing of 1/100-minute. The final note of the four input note sequence corresponds to the eighth-note. The eighth-note's duration is ⅞ of the spacing from its following note, had a following note or fifth note being inputted, or a spacing of 1/200-minute. Following the 1/200-minute interval, the device halts. The REPLAY indicator 4, which was "on" during this time period between the end of the ½-second delay and the end of the 1/200-minute interval turns "off". As the REPLAY indicator 4 turns "off", the ENTER indicator 3 turns "on", indicating that more note values may now be inputted through the keyboard, if desired, to follow the four notes previously inputted.

If the user desires to hear and see the rhythm of the four notes again, he may do so after the device halts by depressing in sequence the START AT switch 46, the "1" switch 32, and the REPLAY switch 47, whereupon the same events described above after the operation of the REPLAY switch 47 will again occur.

Should the user desire to hear and see the rhythm of the four notes without the three preceding warm-up notes, he may do so by depressing the switch START AT 46, "4" 35 and REPLAY 47. The four notes will then begin immediately following the ½-second initial delay. Generally, no warm-up notes will occur when the LOCATION display 7 reads something other than "1" at the instant when the REPLAY switch 47 is depressed.

In the above example, the user entered a four note sequence of a composition, which resulted in the use of seven storage locations out of 30 available storage locations. It is possible for the user to enter more note values following the four notes, until the location display 7 reads "31". At that point, no more notes from the sequence on the music composition may be accommodated by the device.

EXAMPLE 2

Example 2 illustrates the use of the rhythm-tempo tutoring device to replay the following sequence of musical notes:

Assume the user, having permitted the device to finish the sequence of events following operation of the REPLAY switch 47 in Example 1, desires to enter a different set of symbols from another section of the musical composition. Suppose further that the time signature and tempo remain unchanged from that in Example 1. The user depresses in sequence the switches START AT 46, "1" 32 and ENTER 48, whereupon the ENTER indicator 3 turns "on", confirming that the device is initialized to accept musical symbols. The user then depresses in sequence the switches corresponding to the sixteenth-note 15, thirty-second-note 16, half-note-triplet 17, quater-note-triplet 18, half-note quintuplet 19, and quarter-note quintuplet 20. As each switch 15 through 20 is depressed, the LOCATION display 7 is incremented by one for the sixteenth-note and thirty-second-note, three for each triplet and five for each quintuplet, confirming that the microprocessing unit 62 has stored the results of a calculation corresponding to keyboard inputted note values. At the conclusion of the above operations, the LOCATIONS display 7 will display "22". Immediately following the input operations, the user then depresses the sequence of switches, START AT 46, "4" 35, and REPLAY 47. A time delay of approximately ½-second occurs immediately following operation of the REPLAY switch 47, during which time all visual displays 1 through 9 are "off" and no audible sound is heard from the speaker 10.

Beginning immediately after the ½-second time delay, an audible and visual note corresponding to the note value stored at the time the sixteenth-note switch 15 was depressed will be heard and seen. The note will have an audible and visual duration of ⅞ of its spacing from the first following note. The spacing is 1/400-minute and is determined by the tempo of 100. The duration will therefore be, (⅞) (1/400) = 7/3200-minute. The first following note corresponding to information stored at the time the thirty-second-note switch 16 was depressed has an audible and visual duration equal to ⅞ of its spacing from the second following note, the spacing being 1/800-minute. The second, third and fourth following notes are identical and correspond to the information stored at the time the half-note-triplet switch 17 was depressed. Each of these three notes has an audible and visual duration equal to ⅞ of its spacing from the note which follows it, the spacing being 1/150-minute. The fifth, sixth and seventh following notes are identical, and correspond to information stored at the time the quarter-note-triplet switch 18 was depressed. Each of these three notes has an audible and visual duration equal to ⅞ of its spacing from the note which follows it, the spacing being 1/300-minute. Similarly, the eighth through twelfth following notes are identical, and correspond to the information stored at the time the half-note-quintuplet switch 19 was depressed. Each of these five notes has an audible and visual duration equal to ⅞ of its spacing from the note which follows it, the spacing being 1/250-minute. The thirteenth through seventeenth following notes are identical, and correspond to the information stored at the time the quarter-note-quintuplet switch 20 was depressed. Each of these five notes has an audible and visual duration equal to ⅞ its spacing from the note which follows it, the spacing being 1/500-minute. The duration of each quintuplet is therefore, (7/8) (1/500) = 7/4000-minute. At the conclusion of the entire sequence of eighteen replayed notes, the device will halt, the LOCATION display 7 will display "22", the REPLAY display 4 will turn "off", and the ENTER display 3 will turn "on".

In Examples 1 and 2, the temporal spacing of each replay note from the note following it was explained to be a reflection of the tempo 100 beats per minute, which the user entered as information into the device. In general, the spacing of any note from the following note is inversely proportional to the tempo displayed on the TEMPO display 6 at the time the note value was inputted through the keyboard. For instance, a quarter note entered by depressing the quarter-note switch 13 with a TEMPO of "100" results in a replayed note having a spacing of 1/100-minute from the note following it. If the TEMPO were "200" rather than "100", the resulting replayed note would have been spaced 1/200-minute from the note following it. The device will accommodate any tempo between 40 and 208 beats per minute, the range commonly used in music.

All of the musical symbols input through the keyboard by the operator in Examples 1 and 2 represent "note" values, which result in an audible sound of 1000 Hz from the speaker 10 during the first ⅞ of the temporal space occupied by each note during a replay sequence. During the same ⅞ of the temporal space occupied, the VISUAL BEAT display 2 is "on" and the VISUAL BEAT display 1 is "off". Conversely, in the remaining ⅛ of the temporal space occupied by the note the VISUAL BEAT display 2 is "off" and the VISUAL BEAT display 1 is "on".

There are six "rest" value switches 21 through 26, which operate similarly to the six "note" value switches 11–20, except that during a replay sequence no audible sound results corresponding to information stored at the time one of the "rest" switches is depressed during the preceding entry sequence. For instance, the "whole-rest" switch 21 corresponds to the whole-note switch 11 and had the whole-rest switch 21 been depressed in Example 1, rather than the whole-note switch 11, silence would have replaced the tone which occurred during the corresponding 4/100 -minute interval within the replay sequence.

EXAMPLE 3

Example 3 illustrates the ritard, dot, staccato and tie features of the tutoring device to replay the following sequence of musical notes:

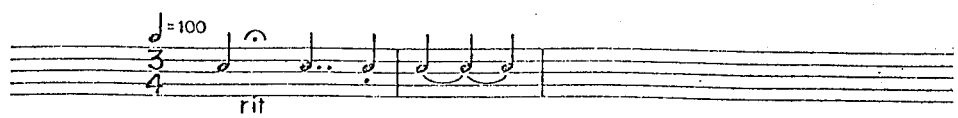

Assume that the user, having permitted the device to finish the sequence of events following operation of the REPLAY switch 47 in Example 2, desires to enter a third set of musical symbols from another section of the same musical composition having the same tempo and time signature. The user depresses in sequence the switches START AT 46, "1" 32, and ENTER 48. The ENTER indicator 3 then turns on and the LOCATION display 7 displays "4", confirming that the device is initialized to accept musical symbols input through the keyboard. The user then depresses in sequence the switches corresponding to the quarter-note 13, "ritard" 29, quarter-note 13, the "dot" 27, "dot" 27, quarter-note 13, "staccato" 28, quarter-note 13, the "tie" 30, quarter-note 13, "tie" 30 and quarter-note 13. During this sequence of operations, the LOCATION display 7 is incremented for each input of the quarter-note key 13 except the last two, and remains unchanged upon operation of switches 29, 27, 28 and 30. Immediately following the above input, the user then depresses the sequence of switches START AT 46, "4" 35 and REPLAY 47. A time delay of approximately ½ -second occurs immediately following operation of the REPLAY switch 47 during which time all visual displays 1 through 9 are "off" and no audible sound is heard from the speaker 10.

Beginning at the end of the ½ -second delay an audible and visual note is heard and seen corresponding to information stored during the input of the quarter-note value 13 and modified by operation of the ritard switch 29. This note's audible and visual duration is ⅞ of its spacing from the note following it, the spacing being 2 × 1/100 = 1/50 -minute. The spacing is determined by the tempo of 100 beats per minute and the operation of the ritard switch, which doubles the replay spacing of the note value most recently inputted through the keyboard. This note's duration is therefore, 7/8 (1/50) = 7/400 -minute. Beginning immediately at the end of the 1/50 -minute interval, an audible and visual note is heard and displayed corresponding to information stored during the input of the second quarter-note and modified by the two inputs of the dot switch 27. This note's audible and visual duration is ⅞ of its spacing from the note following it, the spacing being 1/100 + ½ (1/100) + ¼ (1/100) = 7/400 -minute. The spacing is a reflection of the tempo of 100 beats per minute and the operation of the dot switch 28. The dot switch 28 functions to add a note value of half the value of the note most recently entered, except that if the dot switch 28 is depressed twice or more in succession, then the note value added for each operation is half the amount added for the immediately preceding operation. The duration of the double dotted quarter-note is therefore, 7/8 (7/400) = 49/3200 -minute.

Beginning immediately at the end of the 7/400 -minute interval occurs an audible and visual note corresponding to information stored during the third depression of the quarter-note switch 13 and modified by operation of the staccato switch 27. This note's audible and visual duration is ¼ of its spacing from the note following it, the spacing being 1/100 -minute. This variation of audible and visual duration from a standard unmodified quarter-note or ⅞ is caused by the effect of operating the staccato switch 27 during the input sequence. The staccato switch causes a truncation of the replay duration of the most recently-inputted note from ⅞ of its temporal spacing to ¼ of the spacing.

At the end of the 1/100 -minute interval an audible and visual note corresponding to information stored during the input of the fourth quarter-note value as modified by the fifth and sixth operations of the quarter-note switch 13 is heard and displayed. This note's audible and visual duration is ⅞ is its spacing from the note following it, had there been one, and the spacing is 1/100 + 1/100 + 1/100 = 3/100 -minute. This spacing results from the operation of the tie switch 30 during an input sequence. The tie switch functions to add the replay space of the first note entered after the operation of the tie switch 30 to the replay space of the most-recently-entered note before the tie switch 30 is depressed. Following the 3/100 -minute space the device halts, the LOCATION display 7 display "8", the REPLAY display 4 turns "off" and the ENTER display 3 turns "on".

EXAMPLE 4

Example 4 illustrates the warm-up note feature of the tutoring device to replay the following sequence of musical notes:

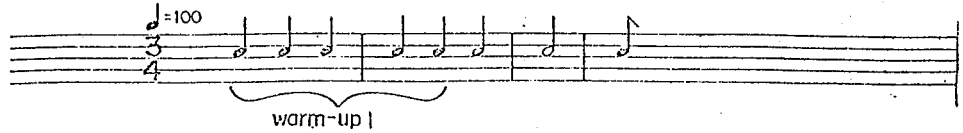

Suppose the user, having permitted the device to finish the sequence of events following operation of the REPLAY switch 47 in Example 3, desires to enter a fourth set of symbols from another section of the musical composition having the same time signature and tempo. The user depresses in sequence the switches START At 46, "1" 32, and ENTER 48, whereupon the ENTER indicator 3 turns "on" and the LOCATION display 7 displays "4", confirming that the device is initialized to accept musical symbols. The user then depresses in sequence the quarter-note switch 13, the bar switch 42, whole-note switch 11, bar switch 42 and the eighth-note switch 14. As each note value is inputted, the LOCATION display 7 is incremented by one, illustrating that one storage location is used for information related to each operation of the bar switch 42. Immediately following the input sequence the user then operates in sequence the switches START At 46, "1" 32 and REPLAY 47. A ½-second time delay occurs immediately following operation of the REPLAY switch 47 during which time visual displays 1 through 9 are "off" and no audible sound is heard from the speaker 10.

Immediately following the delay, five warm-up notes are heard from the speaker 10 and visually displayed on the VISUAL BEAT indicators 1 and 2. The warm-up notes are spaced in time 1/100 -minute apart, the spacing being determined by the tempo of 100 beats per minute and time signature of ¾. Following the fifth warm-up note and spaced from its beginning by 1/100 -minute the note corresponding to information stored when the quarter-note switch 13 was depressed is heard and displayed. The note's audible and visual duration is ⅞ of its spacing from the first following note, the spacing being 1/100 -minute. The first following note corresponds to the information stored by the microprocessing unit 62 representing the whole-note value, switch 12. The whole-note's audible and visual duration is ⅞ of its spacing from the second following note, the spacing being 4/100 -minute. The duration is therefore, ⅞ (4/100) = 7/200 -minute. The second following note corresponds to information stored at the time the eighth-note switch 14 was depressed. The eighth-note's audible and visual duration is ⅞ of its spacing from the third following note had there been one, the spacing being 1/200 -minute. Following said 1/200 -minute interval, the device halts.

This example provides one illustration of the operation of the bar switch 42 during an input sequence. Generally, any operation of the bar switch 42 after its first operation during an input sequence has no effect on the replay of the information stored for the sequence. The first operation of the bar switch 42 during the input sequence may result in an increase in the number of warm-up notes at the beginning of the corresponding replay sequence. Normally, the number of warm-up notes in a replay is equal to the number displayed by TIME SIGNATURE display 8 during the replay. However, when the bar switch 42 is depressed during an entry sequence, the number of warm-up notes is increased, if necessary, so that the entire replay sequence, including warm-up notes, appears to the user to begin immediately following a completed measure of the musical composition, that is, there are no partially-filled measures.

EXAMPLE 5

Example 5 illustrates a tempo change within the following sequence of notes:

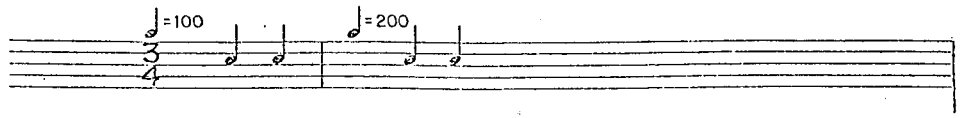

Suppose the user, having permitted the device to finish the sequence of events following operation of the REPLAY switch 47 in Example 4, desires to input a fifth set of symbols from another section of the musical composition. The user then depresses in sequence the switches START AT 46, "1" 32, and ENTER 48, whereupon the ENTER indicator 3 turns "on" and the LOCATION display 7 displays "4", confirming that the device is initialized to accept musical symbols. The user then depresses in sequence the switches quarter-note 13, quarter-note 13, SET TEMPO 45, "2" 33, "0" 31, "0" 31 and ENTER 48. The TEMPO display 6 now reads "200", confirming that notes subsequently inputted will be considered to be at a tempo of 200 beats per minute in the musical composition, and that the device is initialized for entry of more musical symbols. The user then depresses the sequence of switches quarter-note 13 and quarter-note 13. Then the user initiates a replay by depressing in sequence the switches START AT 46, "4" 35 and REPLAY 47.

Following the usual ½-second delay during which visual displays 1 through 9 are "off" and no audible sound comes from the speaker 10, four replayed notes are heard. Each note has a duration equal to ⅞ of its spacing from the following note. The first two notes have a spacing of 1/100 -minute from the notes which follow them respectively, and the last two have a spacing of 1/200 -minute from the notes which follow them respectively. The duration of each of the first two quarter-notes is therefore, ⅞ (1/100) = 7/800 -minute. The duration of the third and fourth quarter-notes is ⅞ (1/200) = 7/1600 -minute.

The effect of depressing the CLEAR switch 49 is to return the device to the initial state following application of power. This result occurs for any operation of the CLEAR switch regardless of when the operation occurs.

The effect of depressing the METRONOME key 43 is to initiate a replay sequence of audible and visual notes of duration one-half of their spacing, the spacing being 1/100 -minute for the case where the TEMPO display 6 reads "100", and inversely proportional to tempo for other readings of the TEMPO display 6. The metronome replay sequence continues indefinitely until interrupted by operation of the CLEAR switch 49. The use of those numeric switches not discussed in the above examples are similarly used to input tempo and time signature values into the device.

Other embodiments of the circuitry of the present invention are also possible. For example, the microprocessor and related circuitry can be fabricated on a single integrated circuit chip, such as a TMCO952NL utilized in the Texas Instruments Model TI-1250 calculator. It is also possible to add or delete features of the present invention by reprogramming the storage units 90-101. For example, warm-up notes can be deleted or the effect of the ritard key can be made adjustable by the operator. Further, in a more sophisticated device, the frequency or "pitch" of the replayed tones may be programmed by the operator.

It may thus be seen that the present invention contemplates a system for enabling any desired sequence of note values to be accurately reproduced at any selected rhythm and tempo. The present device is simple to operate and may be easily programmed by an inexperienced student with no knowledge of electronics. Once programmed, the device can reproduce the desired music repeatedly in order to allow the student to master the composition.

Whereas the present invention has been described with respect to specific embodiments thereof, it will be understood that various changes and modifications will be suggested to one skilled in the art, and it is intended to encompass such changes and modifications are fall within the scope of the appended claims.

What is claimed is:

1. A musical rhythm-tempo tutoring device comprising:
   a housing;
   a keyboard mounted on said housing and including numerical switch means each corresponding to different digits and selectively operable to input a musical tempo value;
   said keyboard further including a plurality of musical note switch means each corresponding to different musical note values and selectively operable to enable the operator to input a predetermined sequence of musical note values of a musical composition;
   means responsive to said numerical switch means for sequentially storing said tempo value and said predetermined sequence of musical note values; and
   means for producing a sequence of tones having durations and spacings corresponding to said stored musical note values and having the rhythm and tempo of said keyboard input note and tempo values.

2. The tutoring device of claim 1 wherein said housing further includes:
   display means responsive to said numerical switch means for visually displaying said musical tempo value.

3. The tutoring device of claim 1 wherein said numerical switch means are selectively operable to input a musical time signature value.

4. The tutoring device of claim 3 wherein said housing further includes means responsive to said numerical switch means for storing said musical time signature value.

5. The tutoring device of claim 3 wherein said housing further includes:
   display means responsive to said numerical switch means for visually displaying said musical time signature value.

6. The tutoring device of claim 1 wherein said housing further includes:
   means for producing a visual display representing said input sequence of note values, said display being dependent upon said input tempo and note values.

7. The tutoring device of claim 6 wherein said means for producing a visual display comprises:
   a plurality of light sources producing alternating impulses of light representing said input predetermined sequence of note values, wherein each note value has a visible duration. dependent upon said tempo and note values.

8. The tutoring device of claim 1 wherein said keyboard further includes:
   means for producing a plurality of tones having equal duration and spacing representing said tempo value inputted through said keyboard.

9. The tutoring device of claim 1 wherein said housing further including means for counting the number of musical note values calculated from note values input through said keyboard.

10. The tutoring device of claim 9 wherein said housing further includes display means for visually displaying said number of musical note values calculated from note values input through said keyboard and counted by said counting means.

11. The tutoring device of claim 1 wherein said keyboard further includes:
    a plurality of switch means, selectively operable to enable the operator to input durations of silence between said individual tones of said tone sequence, said switch means corresponding to different musical rests between notes of said musical composition.

12. The tutoring device of claim 1 wherein said means for producing said sequence of tones comprises an audible tone transducer.

13. The tutoring device of claim 1 wherein said numerical switch means are selectively operable to input a starting location to enable the operator to select a predetermined note location within said stored sequence of musical note values at which to begin replay of said stored sequence of notes.

14. The tutoring device of claim 1 wherein said keyboard further includes:
    a plurality of switch means selectively operable to enable the operator to modify said durations and spacings of said keyboard input note values, said switch means corresponding to different musical modifiers of said musical composition.

15. The tutoring device of claim 14 wherein said musical modifiers include: dots, ties, ritards and staccatos.

16. The tutoring device of claim 1 wherein said housing further includes means for generating a time delay before producing said sequence of tones to enable the operator to prepare for reception of said tone sequence.

17. A musical rhythm-tempo tutoring device, comprising:
    a housing;
    electronic circuit means within said housing;
    a keyboard mounted on said housing including a first array of switch means corresponding to different digits and selectively operable to enable the operator to select a musical tempo value and musical time signature value;
    first switch means located on said keyboard for inputting said selected tempo value into said electronic circuit means;
    second switch means located on said keyboard for inputting said selected time signature value into said electronic circuit means;
    said keyboard further including a second array of switch means corresponding to different musical note values and selectively operable to enable the operator to select a predetermined sequence of musical note values of a musical composition;
    third switch means located on said keyboard for inputting said selected predetermined sequence of note values into said electronic circuit means;
    said electronic circuit means responsive to said switch means to calculate and store the value of each of said musical notes of said input note sequence based upon said input tempo and note values; and
    means responsive to said electronic circuit means for producing a sequence of tones, the duration of the individual tones of said sequence corresponding to said plurality of stored musical note values, the rhythm and tempo of said tones of said sequence being dependent upon said keyboard input tempo and note values.

18. The tutoring device of claim 17 wherein said keyboard further includes:
a third array of switch means corresponding to different musical rests and selectively operable to enable the operator to input durations of silence between said individual tones of said tone sequence representing musical rests between said notes of said musical composition.

19. The tutoring device of claim 17 wherein said housing further includes;
display means for visually producing alternating impulses of light representing said plurality of stored musical note values, wherein each note valve has a visible duration dependent on said tempo and time signature values.

20. The tutoring device of claim 17 and further including display means for visually indicating whether the device is reproducing said keyboard inputted sequence of note values.

21. The tutoring device of claim 17 wherein said housing further includes:
display means for visually indicating whether the device is in its operable status to receive inputted musical note values through said keyboard.

22. The tutoring device of claim 17 wherein said housing further includes:
display means responsive to said first array of switch means for visually displaying said selected musical tempo value.

23. The tutoring device of claim 17 wherein said housing further includes:
display means responsive to said first array of switch means for visually displaying said selected musical time signature value.

24. The tutoring device of claim 17 and further including:
means for producing a sequence of tones of equal duration and spacing representing said selected musical tempo value input through said keyboard.

25. The tutoring device of claim 17 wherein said housing further includes:
means for counting the number of musical note values calculated from note values input through said keyboard.

26. The tutoring device of claim 25 wherein said housing further includes:
display means for visually displaying said number of musical note values calculated from note values input through said keyboard and counted by said counting means.

27. The tutoring device of claim 17 wherein said housing further includes:
display means for visually indicating whether an incorrect entry has been inputted to the device.

28. The tutoring device of claim 17 and further including:
fourth switch means located on said panel to enable the operator to reinitialize the device.

29. A musical rhythm-tempo tutoring device comprising:
a housing;
a keyboard input array mounted on said housing including a plurality of switches to input selected musical tempo and note values;
an electronic processor in said housing for processing said note values according to said input tempo and rhythm values;
means in said housing for storing said musical tempo and note values;
switch means for accessing said stored note values;
annunciator means for generating outputs corresponding to said stored note values; and
actuator means for actuating said annunciator means in order to produce a sequence of note values having rhythm and tempo dependent upon said tempo and note values input through said keyboard input array.

30. The tutoring device of claim 29 wherein said processing means comprises a microprocessor integrated circuit.

31. The tutoring device of claim 29 wherein said annunciator means comprises an audible tone transducer.

32. The tutoring device of claim 29 wherein said annunciator means comprises a visual light display.

33. A method of producing a sequence of tones corresponding to a predetermined sequence of notes of a musical composition and having selected tempo values comprising:
entering through a keyboard in a housing the selected musical tempo value;
entering through said keyboard the predetermined sequence of musical note values of the musical composition;
electronically storing the selected musical tempo and sequence of musical note values in said housing; and
generating a sequence of tones having durations corresponding to said stored musical note values and having a rhythm and tempo corresponding to said keyboard entered note and tempo values.

34. The method of claim 33 and further including:
generating a sequence of light pulses wherein the duration of the individual light pulses of said sequence correspond to said stored musical note values and are displayed according to the rhythm and tempo of said tone sequence.

35. The method of claim 33 and further including:
generating a sequence of tones, wherein the duration and spacing of the individual tones of said sequence is constant and corresponds to the selected musical tempo value.

36. The method of claim 33 and further including:
delaying for a predetermined time period the generating of said sequence of tones.

37. The method of claim 33 and further including:
entering through said keyboard a selected musical time signature value;
electronically storing said musical time signature value in said housing;
generating a plurality of tones, the number of said tones being determined by said stored musical time signature value, said tones having a rhythm and tempo corresponding to said keyboard entered tempo value.

* * * * *